3,429,921
PREPARATION OF 5-HYDROXY-5, AMINOALKYL-10,11 - DIHYDRO - 5H - DIBENZO-[a,d] - CYCLO-HEPTENES
Nils Sixten Hjelte, Storvreta, and Ragnvald Erik Lindblom, Uppsala, Sweden, assignors to Aktiebolaget Pharmacia, a company of Sweden
No Drawing. Filed Nov. 26, 1963, Ser. No. 326,196
Claims priority, application Sweden, Nov. 29, 1962, 12,841; July 23, 1963, 8,124; Nov. 19, 1963, 12,756
U.S. Cl. 260—570.8          3 Claims
Int. Cl. C07c 85/00; C07d 29/10

The present invention concerns the preparation of 5-hydroxy - 5 - aminoalkyl - 10,11 - dihydro - 5H - dibenzo - [a,d]-cycloheptenes of the general Formula I

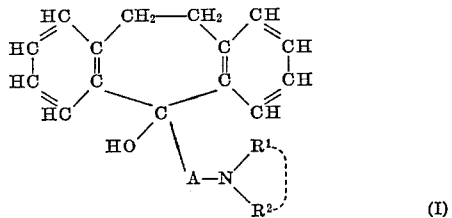

(I)

wherein A is a 1,2- or 1,3-alkylene, containing no more than 5 carbon atoms, and at least one of $R^1$ and $R^2$ is hydrogen and the other is a member selected from the group consisting of lower alkyl, lower cycloalkyl or benzyl and $R^1$ and $R^2$ taken together with the nitrogen atom form a heterocyclic ring system, $R^1$ and $R^2$ in both cases together containing no more than 6 carbon atoms, and therapeutically acceptable acid-addition salts thereof.

The invention also relates to novel compounds prepared according to the invention. The novel compounds are of the following general formula:

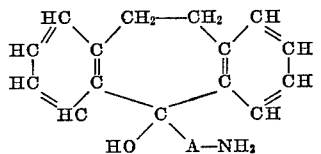

wherein A is a 1,2- or 1,3-alkylene, containing no more than 5 carbon atoms. The invention, furthermore, encompasses therapeutically acceptable acid-addition salts of the novel compounds.

Among compounds encompassed by the Formula I are those previously known, the amino group of which is secondary and tertiary. Compounds having their amino group unsubstituted have not been described in literature. According to the method currently used, compounds carrying a tertiary amino group are prepared from 10,11-dihydro - 5H - dibenzo - [a,d] - cycloheptene - 5 - one (dibenzosuberone) by treating the latter with a Grignard reagent containing the group to be introduced. For the preparation of compounds having a secondary amino group the dibenzo-suberone is reacted with a Grignard reagent, containing a tert. aminoalkyl group, one substituent of which at the nitrogen atom is then split off by hydrogenolysis in a susequent reaction.

The preparation of a tert·aminoalkyl Grignard reagent is always connected with troubles, in that there is required a highly active magnesium metal and the reaction has to be initiated with methyl or ethyl bromide. In general, the reaction time will be very long, there being examples of reactions of the type as set forth requiring about 20 hours to go to an end. Grignard reagents are, furthermore, so reactive that they may even begin to burn in the atmosphere, which means that rigorous safety expedients have to be undertaken in plants in which such a Grignard reaction is to be carried out. It has now been proven that the keto compound above set forth (having the Formula II set forth beneath) will readily add 2 atoms of an alkali metal to form a relatively safe reagent which can be reacted with an amino alkyl halide of the Formula III

(III)

wherein $R^1$, $R^2$ and A have the above significance and X is halogen. The latter reaction takes place at a satisfactory rate, resulting, on hydrolysis, in a good yield of a product of excellent purity. The risks of using, for example, sodium metal will be lowered considerably due to the high rate at which the addition takes place. In this connection, it can be mentioned that it has not at all been possible, by using the Grignard method, to prepare compounds of the above Formula I, the amino group of which is unsubstituted.

The present invention is characterized by reacting 10,11-dihydro - 5H - dibenzo - [a,d] - cycloheptene-5-one of the Formula II

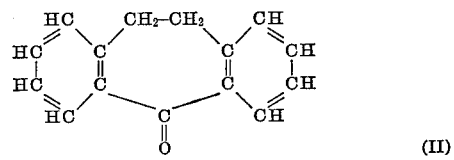

(II)

with an alkali metal selected from the group consisting of sodium and potassium and with a compound of the Formula III

(III)

wherein A, X, $R^1$ and $R^2$ have the above significance and X is a halogen, to form a compound of the Formula IV

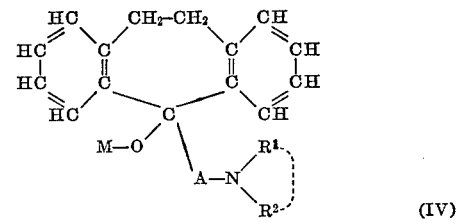

(IV)

wherein A, $R^1$ and $R^2$ have the above significance and M is an alkali metal atom selected from the group consisting of sodium and potassium, hydrolyzing the compound obtained and converting, if desired, the compound obtained on the hydrolysis of the Formula I into its therapeutically acceptable acid-addition salt.

As substituents $R^1$, $R^2$,

A, X and M in the compounds of the above formulae may be mentioned, for example:

$R^1$ or $R^2$ or both: hydrogen and the other R, if any: methyl, ethyl, n-propyl, isopropyl, n-butyl, 2-methylpropyl, 1-methylpropyl, trimethylmethyl, cyclopentyl, cyclohexyl, and benzyl,

pyrrolidino, morpholino, piperidino, 1-methyl-4-piperazino,

A: ethylene, 1,3-propylene, 1-methyl-1,2-ethylene, 2-methyl-1,2-ethylene, 2-methyl-1,3-propylene, 3-methyl-1,3-propylene, 2-ethyl-1,3-propylene, and 3-ethyl-1,3-propylene, X: chloro, bromo, and iodo, M: sodium, and potassium The reaction with alkalimetal can be carried out separately from the reaction with the compound of the Formula III. It can be carried out using the metal dissolved in liquid ammonia and/or in the presence of an inert reaction medium in which the metal is dispersable, such as benzene, toluene, xylene, diethyl ether or fractions of light hydrocarbons, for example extraction gasolines, or petroleum ether.

Compounds of the Formula I in which $R^1$ and $R^2$ each are hydrogen, have not previously been described in literature. The compounds have proved to possess spasmolytic properties. The compounds having the Formula I can be treated with water-splitting off agents to convert them into the corresponding alkylidene compounds which are valuable agents capable of acting upon the central nervous system. For this purpose the compounds can be treated with strong organic and inorganic acids such as hydrobromic acid.

The following examples are illustrative of preferred embodiments of the present invention. It should be understood that these examples are not intended to limit the invention and that obvious changes may be made by those skilled in the art without changing the essential characteristics and the basic concept of the invention.

Example 1.—5-hydroxy-5-(3-N,N-dimethylaminopropyl)-10,11-dihydro-5H-dibenzo[a,d]-cycloheptene 4.8 g. of sodium metal are dissolved in 250 ml. of liquid ammonia whereupon to the solution obtained are added 20.8 g. of 10,11-dihydro-5H-dibenzo[a,d]-cycloheptene-5-one dissolved in 50 ml. of dried diethyl ether in 20 minutes. 12.2 g. of 1-N,N-dimethylamino-3-chloropropane dissolved in 50 ml. of diethyl ether are added dropwise to the reaction mixture. To the whole are then added 150 ml. of dried ether, whereupon the mixture is permitted to stand for 16 hours. It is poured out into 100 ml. of 5 N acetic acid. The acid phase is made alkaline with 5 N sodium hydroxide to precipitate the compound in the form of crystals which are dried. The yield of 5-hydroxy-5-(3-N,N-dimethyl-aminopropyl) - 10,11 - dihydro - 5H-dibenzo[a,d]-cycloheptene, 23.5 g. (79.8%); melting point 112–115° C. After recrystallization, the compound will obtain the melting point 116–118° C. The melting point of the hydrochloride is 218–218.5° C.

Analysis. Calculated: C, 81.51%; N, 8.80%; N, 4.53%. Found: C, 81.22%; N, 8.63%; N, 4.77%.

Example 2.—5 - hydroxy - 5 - (2 - methyl - 3 - N,N-dimethyl - aminopropyl) - 10,11 - dihydro - 5H - dibenzo-[a,d]-cycloheptene In a similar manner as set forth in Example 1, there are obtained 5-hydroxy-5-(2-methyl - 3 - N,N-dimethyl-aminopropyl)-10,11-dihydro - 5H - dibenzo-[a,d]-cycloheptene from 4.8 g. of sodium metal, 250 ml. of liquid ammonia, 20.8 g. of 10,11-dihydro-5H-dibenzo-[a,d]-cycloheptene-5-one and 13.6 g. of 1-dimethylamino-2-methyl-3-chloropropane. After recrystallization, there are obtained 22 g. (73.5 percent) of the compound having the melting point 148–149.5° C. The melting point of the hydrochloride is 209.5–211.5° C.

Analysis.—Calculated: C, 81.51%; H, 8.80%; N, 4.53%. Found: C, 81.89%; H, 8.86%; N, 4.68%.

Example 3.—5-hydroxy-5-(2-N,N-diethylaminoethyl)-10,11-dihydro-5H-dibenzo-[a,d]-cycloheptene From 4.8 g. of sodium metal, 250 ml. of liquid ammonia, 20.8 g. of 10,11-dihydro-5H-dibenzo-[a,d]-cycloheptene-5-one and the free base from 19 g. of 1-diethylamino-2-chloroethane hydrochloride are obtained in a manner similar to what is given in Example 1. 5-hydroxy-5 - (2 - N,N - diethylaminoethyl) - 10,11 - dihydro-5H-dibenzo-[a,d]-cycloheptene. After recrystallization from a mixture of benzene and petroleum ether there are obtained 8 g. (26.5 percent) of the compound having the melting point 90–91.5° C. The melting point of the hydrochloride is 212–213.5° C.

Analysis.—Calculated: C, 81.51%; H, 8.80%; N, 4.53%. Found: C, 81.12%; H, 8.85%; N, 4.65%.

Example 4.—5-hydroxy-5-(3-pyrrolidinopropyl)-10,11-dihydro-5H-dibenzo-[a,d]-cycloheptene From 4.8 g. of sodium metal, 250 ml. of liquid ammonia, 20.8 g. of 10,11-dihydro-5H-dibenzo-[a,d]-cycloheptene-5-one and the base from 22.8 g. of the hydrochloride of 1-pyrrolidino-3-chloropropane are obtained 26.5 g. (83%) of 5-hydroxy-5-(3-pyrrolidinopropyl)-10,11 - dihydro-5H-dibenzo-[a,d]-cycloheptene. After recrystallization from ethyl alcohol, there are obtained 23.6 g. (74%) of the compound having the melting point 149.5–157° C. The melting point of the hydrochloride is 221–222° C.

Analysis.—Calculated: C, 82.20%; H, 8.47%; N, 4.36%. Found: C, 82.46%; H, 8.51%; N, 4.38%.

Example 5.—5-hydroxy-5-(3-moropholinopropyl)-10,11-dihydro-5H-dibenzo-[a, d]-cycloheptene From 4.8 g. of sodium metal, 250 ml. of liquid ammonia, 20.8 g. of 10,11-dilhydro-5H-dibenzo-[a,d]-cycloheptene-5-one and the base from 24 g. of hydrochloride from 1-morpholino-3-chloropropane are obtained 25.6 g. (76 percent) of 5-hydroxy-5-(3-moropholino-propyl)-10,11-dihydro-5H-dibenzo-[a,d]-cycloheptene. Upon recrystallization from ethyl alcohol, there are obtained 21.5 g. of a product (64 percent) having the melting point 155–156.5° C. The melting point of the hydrochloride is 212–212.5° C.

Analysis.—Calculated: C, 78.30%; H, 8.07%; N, 4.15%. Found: C, 77.96%; H, 8.29%; N, 4.09%.

Example 6.—5-hydroxy-5-(3-N-methylaminopropyl)-10,11-dihydro-5H-dibenzo-[a,d]-cycloheptene 32.9 g. (0.158 mole) of 10,11-dihydro-5H-dibenzo-[a,d]-cycloheptene-5-one are dissolved in 50 ml. of diethyl ether, and the solution is added in a dropwise manner within 15 minutes to a solution of 7.3 g. (0.316 g. atoms) of the sodium metal in 250 ml. of liquid ammonia. After about 20 minutes, there is added, in a dropwise manner, a solution of the base from 41 g. (0.176 mole) of hydrobromide of 1-N-methylamino-3-bromopropane in 100 ml. of diethyl ether (the solution dried twice with finely pulverized potassium carbonate. After half an hour, the colour changes from bluish black into yellow. The ammonia is driven off and to the residue is added water. The phases are separated from each other and the aqueous phase is extracted with diethyl ether. The collected ether extracts are dried, and alcoholic hydrochloric acid is added thereto, until pH has reached the value 5. The crystalline substance precipitated is recrystallized from a mixture of equal parts of 99.5 percent ethyl alcohol and diethyl ether. The yield of the hydrochloride of 5-hydroxy-5-(3-N-methylaminopropyl)-10,11-dihydro-5H-dibenzo[a,d]-cycloheptene is 28 g. (56 percent), melting point 200–202° C. From the mother liquor there will be obtained another 15 g. The melting point of the base is 91–92° C.

Example 7.—5-hydroxy-5-(3-aminopropyl)-10,11-dihydro-5H-dibenzo-[a,d]-cycloheptene 1500 ml. of liquid ammonia are placed in a 3 litre flask. In the flask are placed 416 g. (2 moles) of 10,11-dihydro-5H-dibenzo-[a,d]-cycloheptene-5 - one dissolved in 1000 ml. of toluene with agitation and reflux, whereupon 92 g. (4 g. atoms) of sodium metal are added in small portions with slow agitation and refluxing (30 minutes). 20 minutes after the addition of sodium has been finished, a solution of the base from 316 g. of 1-amino-3-chloropropane hydrochloride is added. The agitation is continued and the ammonia is driven off slowly, whereupon the reaction mixture is permitted to obtain room temperature. When the colour of the reaction mixture has changed from yellow, it is poured out into 1000 ml. of water. The organic phase is separated off and washed with 500 ml. of water. After drying it, alcoholic hydrochloric acid is added until pH reaches the value 5. After cooling, the product is filtered and washed with diethyl ether. The yield of the hydrochloride of 5-hydroxy-5-(3-aminopropyl) - 10,11 - dihydro - 5H - dibenzo-[a,d]-cycloheptene is 428 g. (86 percent). After recrystallization of a small sample, a melting point of 178–180° C. is obtained (shrinkage at 155–160° C.).

Unless otherwise indicated the terms used in this specification have the meaning set forth in the most recent edition of Hackh's Chemical Dictionary.

More or less specific claims will be presented hereinafter and even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art and still other obvious equivalents could be readily ascertained upon rather simple, routine, non-inventive experimentation. Certainly no invention would be involved in substituting one or more of such obvious equivalents for the materials specifically recited in the claims. We intend that all such obvious equivalents be encompassed within the scopt of this invention and patent grant in accordance with the well-known doctrine of equivalents.

We claim:
1. A method for the preparation of a compound of the general formula

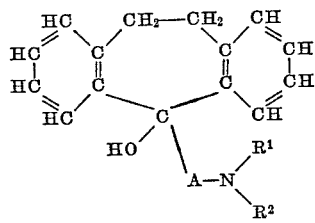

wherein A is a 1,3-alkylene, containing no more than 5 carbon atoms, at least one of $R^1$ and $R^2$ is hydrogen and the other is a member selected from the group consisting of lower alkyl, lower cycloalkyl and benzyl, and $R^1$ and $R^2$ together contain no more than 6 carbon atoms, which comprises reacting 10,11-dihydro-5H-dibenzo-[a,d]-cycloheptene-5-one of the formula

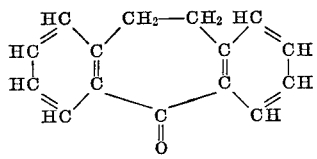

with an alkali metal selected from the group consisting of sodium and potassium of the formula M and with a compound of the formula

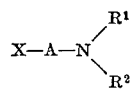

wherein A, $R^1$ and $R^2$ have the above significance and X is a halogen to form a compound of the formula

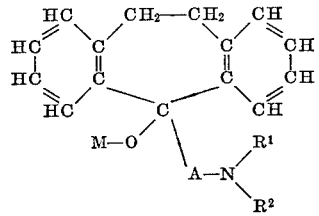

wherein A, $R^1$ and $R^2$ have the above significance and M has the above significance, and hydrolyzing the compound thus formed.

2. A method as claimed in claim 1, wherein the reaction is carried out in the presence of liquid ammonia.

3. A method as claimed in claim 1, wherein the reaction is carried out in the presence of an inert reaction medium.

References Cited

UNITED STATES PATENTS

| | | | |
|---|---|---|---|
| 3,073,847 | 1/1963 | Doebel et al. | 260—240 XR |
| 3,205,264 | 9/1965 | Tristram et al. | 260—570.8 |
| 3,281,469 | 10/1966 | Peters et al. | 260—570.8 |

FOREIGN PATENTS

| | | |
|---|---|---|
| 220,609 | 4/1962 | Austria. |
| 1,333,960 | 7/1962 | France. |
| 289,571 | 5/1928 | Great Britain. |
| 628,904 | 8/1963 | Belgium. |
| 356,759 | 10/1961 | Switzerland. |

OTHER REFERENCES

Carter et al.: Trans. Faraday Soc., vol. 56, pages 343–347 and 455–458 (1960).

German Printed Application No. 1,109,166, published June 1961.

JOHN D. RANDOLPH, *Primary Examiner.*

U.S. Cl. X.R.

260—240, 268, 326.5, 247.7, 294.7, 570.8, 618